(12) United States Patent
Blazek et al.

(10) Patent No.: US 6,531,801 B1
(45) Date of Patent: Mar. 11, 2003

(54) ASYNCHRONOUS MOTORS HAVING SIMPLE ROTOR STRUCTURES

(75) Inventors: Scott T. Blazek, Valparaiso, IN (US); Joseph W. Sliwa, Hammond, IN (US); Anatoly F. Kolesnichenko, Valparaiso, IN (US)

(73) Assignee: Ispat Inland, Inc., Chicago, IL (US)

( * ) Notice: Subject to any disclaimer, the term of this patent is extended or adjusted under 35 U.S.C. 154(b) by 0 days.

(21) Appl. No.: 09/453,334

(22) Filed: Dec. 2, 1999

(51) Int. Cl.⁷ .......................... H02K 19/00; H02K 19/08
(52) U.S. Cl. ................................ 310/261; 310/DIG. 2; 310/166; 68/23.3
(58) Field of Search .................. 510/261, DIG. 2, 510/166; 68/23.3, 23.7

(56) References Cited

U.S. PATENT DOCUMENTS

| | | | | |
|---|---|---|---|---|
| 1,203,138 A | * | 10/1916 | Schuler ....................... | 310/166 |
| 1,722,984 A | | 7/1929 | Hendry ........................ | 210/179 |
| 2,656,702 A | | 10/1953 | Chapin ........................ | 68/154 |
| 3,068,373 A | * | 12/1962 | Bekey ......................... | 310/162 |
| 3,163,788 A | | 12/1964 | Powers ........................ | 310/166 |
| 3,194,032 A | | 7/1965 | von Brimer ................... | 68/23 |
| 3,328,616 A | * | 6/1967 | Ringland ..................... | 310/166 |
| 3,355,914 A | | 12/1967 | Venema et al. ................ | 68/23 |
| 3,465,181 A | | 9/1969 | Colby et al. .................. | 310/44 |
| 3,840,764 A | | 10/1974 | Burger ........................ | 310/185 |
| 4,482,829 A | | 11/1984 | Tardieu et al. ............... | 310/105 |
| 4,843,271 A | | 6/1989 | Shah .......................... | 310/217 |
| 5,001,380 A | * | 3/1991 | Popov et al. ................. | 310/261 |
| 5,185,918 A | | 2/1993 | Shafer, Jr. ................... | 29/598 |
| 5,191,256 A | * | 3/1993 | Reiter, Jr. et al. ........... | 310/156 |
| 5,402,025 A | * | 3/1995 | Saito et al. .................. | 310/156 |
| 5,473,211 A | | 12/1995 | Arkkio ........................ | 310/166 |
| 5,773,909 A | * | 6/1998 | Hansen et al. ................ | 310/261 |
| 5,952,755 A | * | 9/1999 | Lubas ......................... | 310/156 |

OTHER PUBLICATIONS

Hysteresis Motor Using Magnetically Anisotropic Fe–Cr–Co Magnet, IEEE Transactions on Magnetics, vol. 34, No. 6, pp., 3888–3896, Nov. 1998.

Handbook of Electric Motors, Chapter 2 Types of Motors and Their Characteristics Marcel Decker, NY, pp. 151–155, copyright 1995.

* cited by examiner

Primary Examiner—Karl Tamai
(74) Attorney, Agent, or Firm—Marshall, Gerstein & Borun

(57) ABSTRACT

A device for converting electrical energy into mechanical work is disclosed. The device includes a rotor body having a radial length, a ferromagnetic layer having a radial thickness, the ferromagnetic layer being disposed on the of the rotor body, wherein the radial thickness of the ferromagnetic layer is less than the radial length of the rotor body. The device further includes a conductive layer disposed on the ferromagnetic layer and a stator disposed substantially along the rotor body, the ferromagnetic layer and the conductive layer, wherein the stator is adapted to carry an alternating current signal.

32 Claims, 12 Drawing Sheets

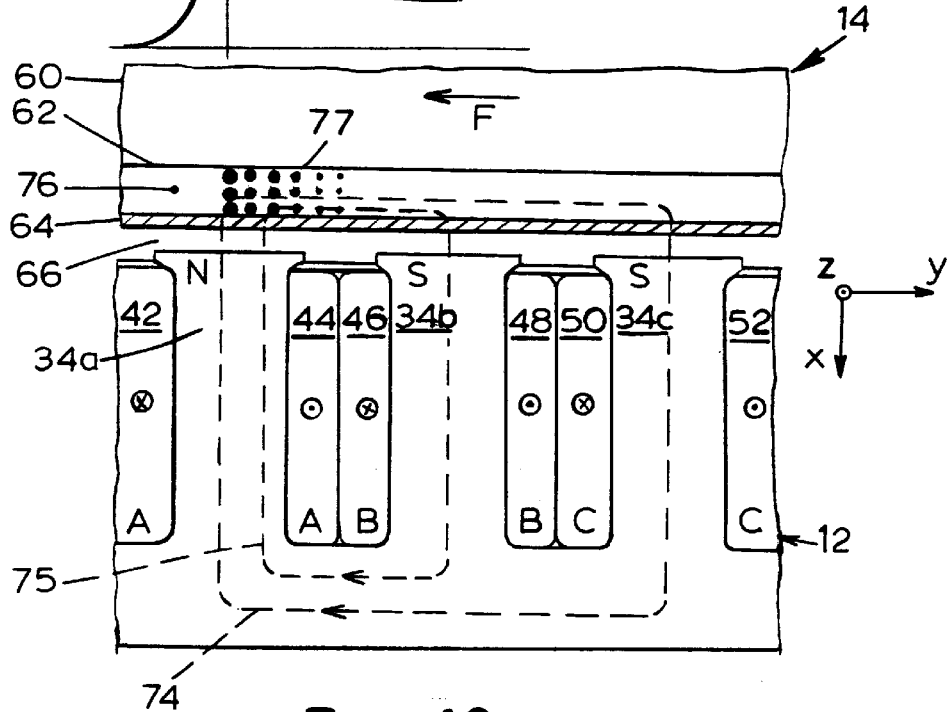
FIG. 13
Fig. 12
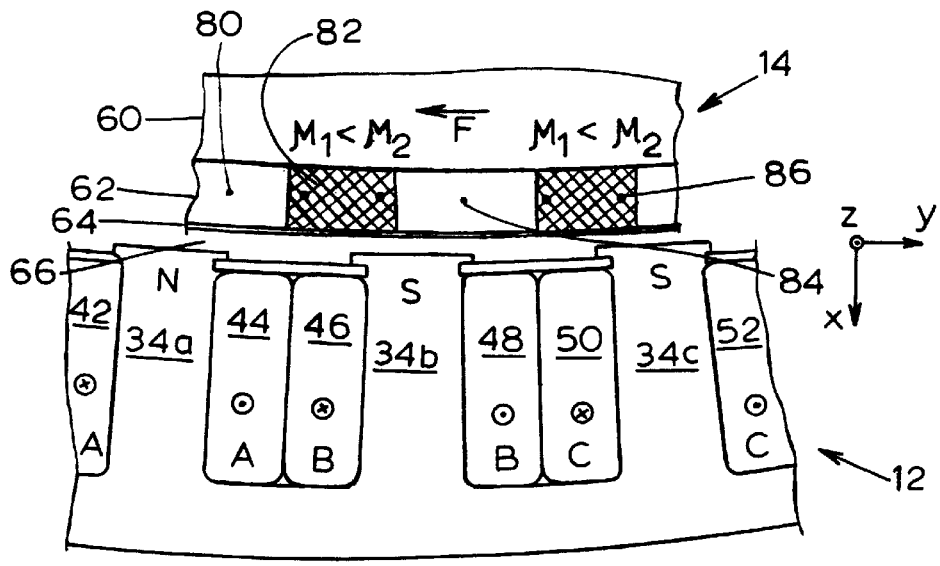
Fig. 14

ASYNCHRONOUS MOTORS HAVING SIMPLE ROTOR STRUCTURES

FIELD OF THE INVENTION

The present invention is directed generally to asynchronous motors and, more particularly, to cylindrical and linear asynchronous motors having simple rotor structures.

BACKGROUND OF THE INVENTION

Conventional induction motors typically include a stator that is electrically connected to drive circuitry, which supplies voltage and current to the stator. Drive circuitry may have variable current, voltage and frequency capabilities. The voltage supplied to the stator creates running magnetic fields that a rotor absorbs and that create currents in the rotor. The currents in the rotor are phase shifted relative to the running magnetic field. The interaction of the induced currents and the running magnetic field creates a force that causes the rotor to move with respect to the stator. In cylindrical motors, this motion is rotational in the azimuth direction. Conversely, in linear motors, this motion is linear with respect to the stator.

Conventionally, a rotor of an asynchronous motor accounts for approximately 35–65 percent of the entire mass of the motor mass. The inertia associated with a spinning rotor is quite large and a large amount of force is needed to start the rotor spinning or to change the speed or direction of the rotor once it is spinning. For example, a variable speed asynchronous motor may consume 4–5 times more current when starting, braking and changing directions, than it consumes during constant speed steady-state operation. This current consumption requires drive circuitry that can supply increased current during starting or direction changing. Furthermore, the startup torque or low speed torque of conventional asynchronous motors is low.

Variable frequency drives may be used for starting a rotor in motion without excessive current consumption. For example, when starting a rotor in motion, the current and voltage supplied to the stator may be reduced in frequency. The reduction in frequency reduces the slip (the ratio of the difference between the speed of the rotating stator field and the speed of the rotor to the speed of the rotating stator field) of the motor, thereby allowing a lower start current to be used. However, a reduction in the frequency of the current and voltage fed to the stator reduces the startup torque available to the rotor. Accordingly, a rotor having a load that is to be turned may be unable to start using the reduced frequency technique because there is inadequate torque to turn the loaded rotor. Variable frequency drives may also be used to control the rotational speed of a rotor in an asynchronous motor. In an asynchronous motor, the lower the frequency of the voltage supplied to a stator, the slower the rotor of that motor will rotate.

One conventional asynchronous motor is the class B squirrel cage induction motor, which has a rotor containing discrete copper or aluminum conductors having their extremities connected by metal rings, wherein the conductors and the rings are embedded inside a massive, laminated ferromagnetic rotor core. A stator field induces currents onto the discrete conductors and those induced currents interact with the stator field to cause the rotor to rotate. The squirrel cage motor has a peak efficiency of approximately 98 percent at roughly 70 percent of synchronous speed. However, when a squirrel cage motor is operated at more or less than roughly 70 percent of synchronous speed, efficiency decreases. As a result, a squirrel cage motor is very inefficient in starting and stopping situations when slip is high. Furthermore, a squirrel cage motor has a torque characteristic having a peak value at approximately 70 percent of synchronous speed. Accordingly, a squirrel cage motor has very low torque in starting and in direction changing situations when the motor is operated at relatively low percentage of synchronous speed.

To alleviate some of the starting, direction changing, speed and torque problems mentioned above, some applications using conventional asynchronous motors employ a mechanical transmission between a rotor and a load. For example, a washing machine may use a mechanical transmission to couple a conventional asynchronous motor to a clothes basket that is rotated at various speeds throughout a washing cycle. The mechanical transmission compensates for the low startup torque of the motor. Additionally, the mechanical transmission enables a washing cycle having fast direction changes and agitation, which are high torque operations, to be carried out using a conventional asynchronous motor. However, the mechanical transmission increases the costs associated with using a conventional asynchronous motor.

SUMMARY OF THE INVENTION

In a first embodiment, the present invention is directed to a device for converting electrical energy into mechanical work. The device includes a rotor body having a radial length and a circumference, a ferromagnetic layer having a radial thickness, the ferromagnetic layer being disposed on the circumference of the rotor body, wherein the radial thickness of the ferromagnetic layer is less than the radial length of the rotor body and a conductive layer disposed on the ferromagnetic layer. The device further includes a stator disposed substantially along the circumference of the rotor body, the ferromagnetic layer and the conductive layer, wherein the stator is adapted to carry an alternating current signal.

In a second embodiment, the present invention is directed to a washing machine including a tank adapted to hold water, a basket disposed within the tank and adapted to hold clothes that are to be washed, the basket having a radial length and an outer circumference, a ferromagnetic layer having a radial thickness, the ferromagnetic layer being disposed on the outer circumference of the basket, wherein the radial thickness of the ferromagnetic layer is less than the radial length of the basket, a conductive layer having a radial thickness, the conductive layer being disposed on the ferromagnetic layer and a stator adjacent the tank and substantially encircling the outer circumference of the rotor body, wherein the stator is adapted to carry an alternating current signal.

In a third embodiment, the present invention is directed to a rotor for use with a stator adapted to carry an alternating current signal. The rotor includes a rotor body having a thickness, a ferromagnetic layer having a thickness, the ferromagnetic layer being disposed on the rotor body, wherein the ferromagnetic layer has a thickness equal to or greater than:

$$\delta_{Fe} = \frac{184b}{\mu^*}$$

wherein:

$\delta_{Fe}$ is the thickness of the ferromagnetic layer;

$\mu^*$ is a relative magnetic permeability of the ferromagnetic layer; and b is a radial thickness of the stator and a conductive layer being disposed on the ferromagnetic layer.

In a fourth embodiment, the present invention is directed to a device for converting electrical energy into mechanical work. The device includes a rotor body, a ferromagnetic layer disposed on the rotor body, a conductive layer disposed on the ferromagnetic layer and a stator disposed substantially along the rotor body, the ferromagnetic layer and the conductive layer. The stator has a plurality of teeth and a plurality of slots between the plurality of teeth, each tooth having a width and each slot having a width so that the ratio of the slot width to the sum of the tooth width and the slot width is about 0.7 to about 0.75.

The above and other aspects and advantages of the present invention will become apparent from the following detailed description of the present invention taken in conjunction with the drawings.

BRIEF DESCRIPTION OF THE DRAWINGS

FIG. 12 is a detail view illustrating the interaction of the rotor layers and the magnetic fields generated by the stator of FIG. 3, which results in Maxwell force;

FIG. 13 is a graph representing, the radial component of flux density distribution in the ferromagnetic layer of the stator of FIG. 3;

FIG. 14 is a detail view illustrating the interaction of the rotor layers and the magnetic fields generated by the stator of FIG. 3, which results in a hysteresis effect force that supplements the Maxwell force;

DETAILED DESCRIPTION OF THE PREFERRED EMBODIMENTS

The present invention is embodied in an asynchronous motor having a simplified rotor structure and having improved speed and torque characteristics. Asynchronous motors embodying the present invention may be cylindrical or linear, each of which have numerous applications. In general, motors constructed in accordance with the present invention utilize Lorentz force, Maxwell force and hysteresis effect force through the use of a simple rotor structure. The use of these three forces allows a motor to have nearly constant torque characteristics over the speed range of the motor.

The following description discloses the mechanical configuration of a motor designed in accordance with the present invention and describes the believed theory of operation of such a motor. Additionally, the following description discloses a particular application of such a motor. This application is merely illustrative and other applications for a motor designed in accordance with the teachings of the present invention exist. Where appropriate, a right-handed coordinate axis has been provided on the drawings for ease of understanding.

Figure 1:
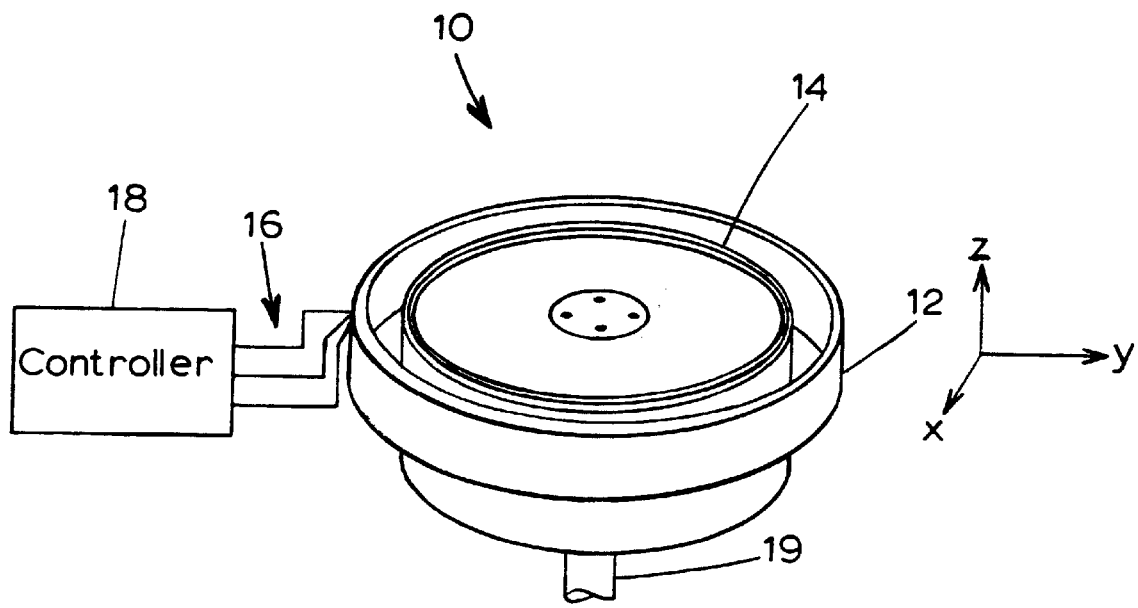
FIG. 1 is a trimetric view of one embodiment of a motor constructed in accordance with the teachings of the present invention.

FIG. 1 illustrates a motor 10 designed in accordance with the teachings of the present invention. The motor 10 includes a stator 12 and a rotor 14. Wire leads 16 are connected between the stator 12 and a controller 18, which may also be referred to as drive circuitry or as a drive. As will be shown and described hereinafter, the stator 12 includes a number of windings that are coupled to the leads 16. The rotor 14 includes a shaft assembly 19 that may be used to couple the rotor 14 to a device that is to be rotated or may be used to support the rotor 14 as it rotates. As referred to hereinafter, an axial length of any component of the motor 10 extends in the Z direction and any radial length extends from the center of the shaft assembly 19 in the X-Y plane.

Generally, during motor operation, the controller 18 generates voltage and current signals that are coupled to the stator 12 to generate rotating magnetic fields that travel (or rotate) around the circumference of the stator 12. As will be described hereinafter, the rotor 14 includes a simple two layer structure that interacts with the rotating magnetic fields produced by the stator 12 to cause the rotor 14 to move with respect to the stator 12. The simple rotor structure is easily manufacturable and durable. Further detail with respect to the rotor 14 can be found with respect to FIGS. 3–6 described hereinafter.

Figure 2:
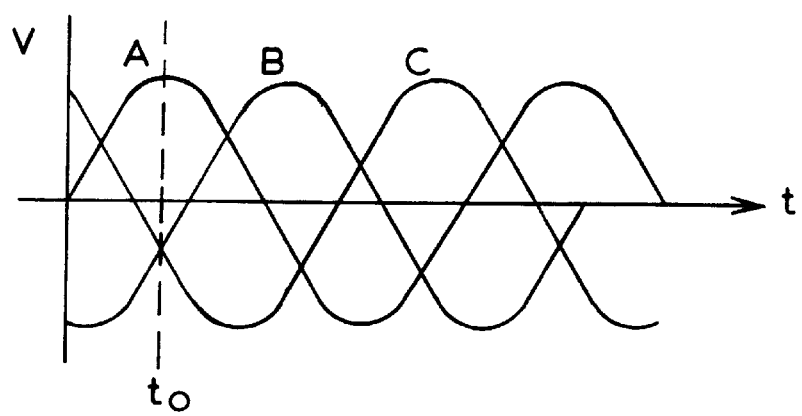
FIG. 2 is a diagram of the output phases of a controller used to supply voltage to a motor constructed in accordance with the teachings of the present invention.

As illustrated in FIG. 2, the controller 18 may generate three phases of voltage and current signals, each of which is 120° out of phase with the other. For purposes of explanation, these phases will be referred to hereinafter as phases A, B, and C, wherein phase A has a phase of 0°, phase B has a phase of 120° with respect to phase A and phase C has a phase of 240° with respect to phase A. As will be appreciated by those of ordinary skill in the art, the controller 18 may be capable of generating voltage and current signals having various amplitudes and frequencies. For example, the controller may be embodied in a Mitel Semiconductor Family of Household Goods Motor Controller (HGMC) having pulse width modulation using an inaudible carrier. Although, the following description presupposes a three phase system, those of ordinary skill in the art will readily recognize that a greater or lesser number of phases can be used to excite the stator 12 to produce the rotating magnetic fields required to cause motion of the rotor 14.

Figure 3:
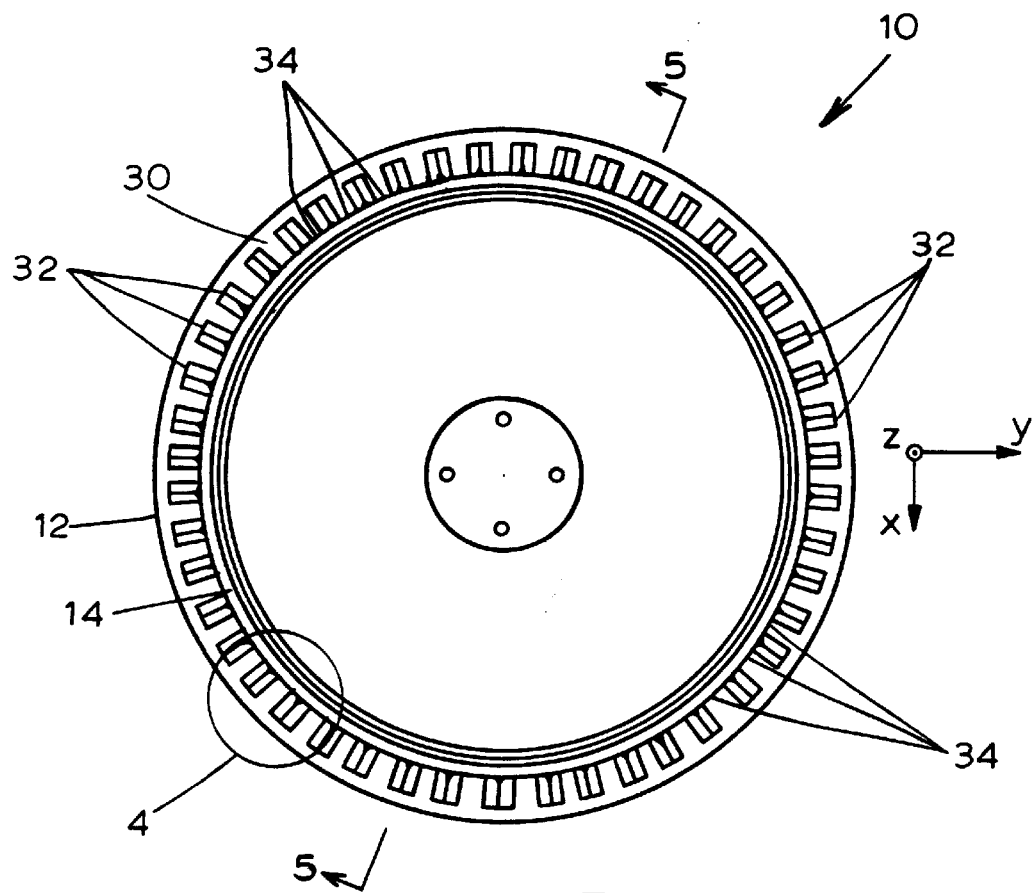
FIG. 3 is a plan view of the motor shown in FIG. 1.

As shown in FIG. 3, the rotor 14 fits inside the stator 12. In other embodiments, the rotor 14 may be configured to surround the stator 12. The stator 12 comprises a ferromagnetic core 30 having a number of slots 32 and a number of teeth 34. The ferromagnetic core 30, the slots 32 and the teeth 34 may be fabricated from punched strips of ferromagnetic material that are bent, coiled and laminated together. Alternatively, the stator 12 may be fabricated from a magneto-dielectric material, which is constructed of ferromagnetic powder. In any event, the relative magnetic permeability of the ferromagnetic core 30 is preferably greater than about 50.

Figure 4:
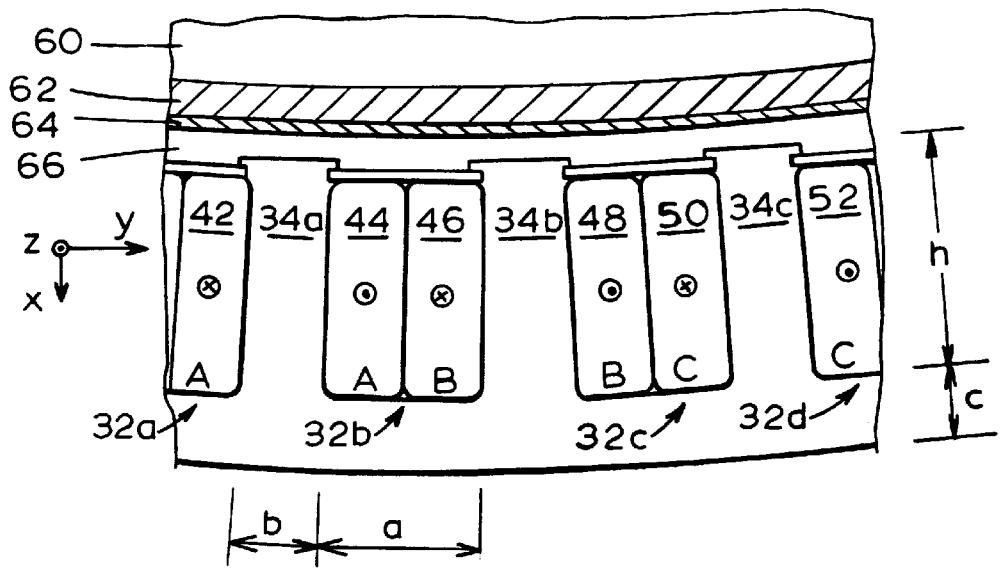
FIG. 4 is a detail view showing the stator winding structure and the layers of the rotor of FIG. 3.

Referring to FIG. 4, a detailed view of the stator 12 and the rotor 14 reveals that windings corresponding to phases A–C are wound around stator teeth 34a, 34b and 34c, respectively, in slots 32a–32d. Each winding has two sections, each one disposed in a slot on either side of the tooth on which the winding is wound. For example, as shown in FIG. 4, a winding connected to phase A has winding sections 42 and 44, a winding connected to phase B has winding sections 46 and 48 and a winding connected to phase C has winding sections 50 and 52. The symbol ⊗ indicates a winding that goes into the plane of the paper and ⊙ indicates a winding that comes out of the plane of the paper. For example, winding sections 42 and 44, which are two halves of the phase A winding, indicate that the windings of phase A come out of the plane of the paper in winding section 44, are wound over the tooth 34a and go into the plane of the paper in winding section 42. Likewise, windings emerge from winding sections 48 and 52 and are wound over teeth 34b and 34c, respectively, before being wound into winding sections 46 and 50, respectively.

In one embodiment, the windings may be made from 30 turns of 16 or 19 gauge copper magnet wire although other numbers of turns and types of wire may be used. Depending on the torque needs of the motor, a particular number of ampere-turns are required on the stator. The required number of ampere-turns may be, for example, made from either a high number of turns on each winding wherein a low current is passed through each winding, a low number of turns on each winding wherein a high current is passed through each winding, etc. Based on the required ampere-turns and the desired current, the winding material and the gauge of the windings are preferably selected to minimize ohmic losses within the windings, while preferably conforming to the National Electric Code (NEC) regulations for current capacity per wire gauge.

As shown in FIG. 4, the stator 12 includes teeth 34a–34c that have associated slots 32a–d in which windings are wound. Preferably, the teeth 34 of the stator 12 are particularly sized with respect to the slots 32 of the stator 12. This sizing may be represented by equations 1 and 2.

$$\frac{a}{a+b} = 0.7 - 0.75 \quad (1)$$

$$\frac{a+b}{h} = 0.3 - 0.35 \quad (2)$$

Wherein, b is the head size (the width) of a stator tooth, a is the azimuth size (the width) of a slot and h is a radial distance from the bottom of a slot to the top of a tooth as shown in FIG. 4. Also shown in FIG. 4 is dimension c, which is a radial distance between the bottom of a slot and the outside of the stator 12. Accordingly, an overall radial thickness of the stator from the tip of a tooth to the outside of the stator may be found by adding dimension h to dimension c.

The axial length of the stator 12 in the Z direction is determined by the power that the motor must provide based on the speed and torque demands that will be placed on the motor. For example, the more power required by the stator windings, the longer the axial dimension of the stator 12 must be to distribute the stator power across a greater area. The length that the stator 12 is extended is determined as the result of optimization of torque (T) or mechanical power (P=Tn), where n is the revolution speed of the rotor in revolutions per minute (RPM). The torque of the motor is represented below in equation 3 and the power of the rotor is represented below in equation 4.

$$T = k_m j \times B \cdot \delta_{cond} \cdot b \cdot Z \cdot D_o \cdot 0.5 \quad (3)$$

$$P = Tn = k_m \phi \cdot \delta_{cond} \cdot D_o \cdot 0.5 \quad (4)$$

where:

$k_m$ is the coefficient of Maxwell force, which is between 1.3 and 1.6;

j is the current density;

B is the magnetic flux density;

φ is the magnetic flux of one pole pitch;

Z is the axial length of the motor;

$D_o$ is the rotor diameter; and $\delta_{cond}$ is the thickness of the conductive layer on the rotor.

The axial length of the stator 12 in the Z direction is preferably proportional to the square root of the ratio of the power increase. For example, if a 1 KW motor were to be converted into a 10 KW motor, the length of the stator 12 in the Z direction would be increased by a factor of $\sqrt{10}$.

Of particular interest in FIG. 4 is the detail of the rotor 14, which reveals that the rotor 14 comprises three layers: a main rotor structure 60, a ferromagnetic layer 62 and a conductive layer 64. The ferromagnetic layer 62 and the conductive layer 64 interact with the rotating magnetic field generated by the stator 12 to produce forces that cause the rotor 14 to move with respect to the stator. More particularly, the ferromagnetic layer 62 interacts with the rotating stator field to produce Maxwell and hysteresis effect forces. The conductive layer 64 interacts with the rotating stator field to produce Lorentz force. Also shown is an air gap 66 disposed between the conductive layer 64 and the stator teeth 34.

Figure 5:
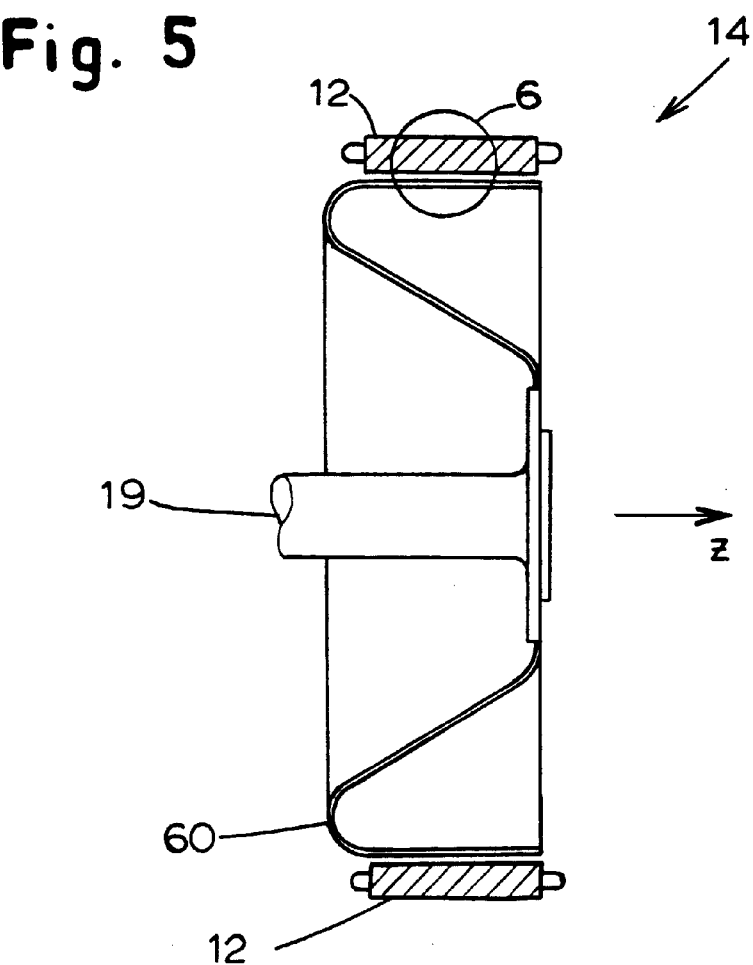
FIG. 5 is a sectional view taken along line 5—5 shown in FIG. 3.
Figure 6:
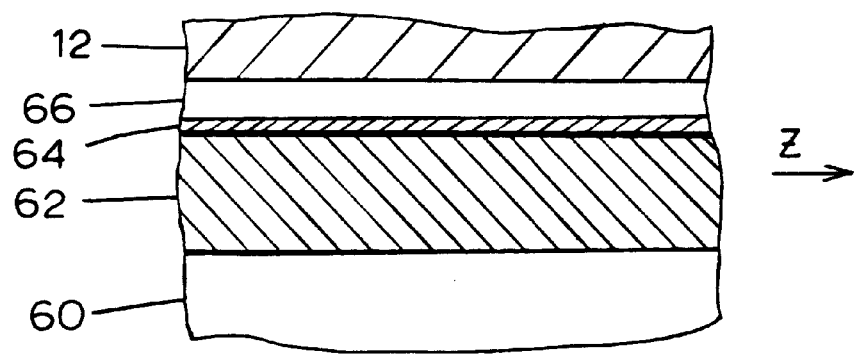
FIG. 6 is a detail view showing the layers of the rotor of FIG. 5.

FIGS. 5 and 6 reveal further detail of the rotor 14 construction by showing cross sectional and detailed cross sectional views of the rotor 14, respectively. The main rotor structure 60 may be hollow and may be fabricated from a non-magnetic material such as plastic, stainless steel or any other non-magnetic material. In some embodiments, the axial length of the rotor body may be less than the radial length of the rotor body. A ferromagnetic layer 62, which may be fabricated from carbon steel, iron, iron derivatives, steel alloys, nickel, cobalt or any other ferromagnetic material having a relative magnetic permeability preferably between about 1500 and about 2500 is disposed on the main rotor structure 60. In one embodiment, the ferromagnetic layer 62 may take the form of a cylinder or band that is fitted around and encircles the main rotor structure 60. Alternatively, the ferromagnetic layer 62 may be a band of material that substantially encircles the main rotor structure 60. For stator current frequencies between 10 and 350 Hertz (Hz), the thickness of the ferromagnetic layer 62 is a function of the relative magnetic permeability of the ferromagnetic layer 62 and the overall thickness of the stator 12. The required minimum thickness ($\delta_{Fe}$) of the ferromagnetic layer 62 may be calculated according to equation 5.

$$\delta_{Fe}=184(h+c)/\mu^* \quad (5)$$

Here, h is the distance from the bottom of a slot to the top of a tooth, c is the distance between the bottom of a slot and the outside of the stator and $\mu^*$ is the relative magnetic permeability of the ferromagnetic material of the rotor. One exemplary set of dimensions is h+c=40 millimeters (mm) and $\mu^*$=2000 which, according to equation 5, yields a ferromagnetic layer 62 thickness of at least 2.45 mm. If the thickness of the ferromagnetic layer 62 is too small, only a small inertial moment will be developed in the rotor 14 because the ferromagnetic layer 62 will saturate with flux. The axial length of the ferromagnetic layer in the Z direction is preferably 10 mm greater than the axial length of the stator 12 and is axially centered on the stator.

Although the ferromagnetic layer 62 is shown as a continuous piece of material, some embodiments may employ numerous portions of ferromagnetic material to create the ferromagnetic layer 62. However, if numerous portions of material are used, it is desirable that the size of each portion extend at least the length of a stator coil group. Additionally, although the ferromagnetic layer 62 shown has no gaps or seams, some embodiments may have gaps or seams therein.

The conductive layer 64, which is disposed between the ferromagnetic layer 62 and the air gap 66, has an optimal thickness that is dictated by the electrical properties of the material selected for the conductive layer 64. Preferably, the conductive layer 64 is fabricated of copper. The air gap 66 may be between 1 mm and 5 mm and preferably is about 1.5 mm. Alternatively, the conductive layer 64 may be fabricated from other conductive materials such as aluminum, silver, gold, copper alloys, zinc, brass and tungsten. The conductive layer 64 may be fixed to the ferromagnetic layer 62 using a number of different methods including plating and deposition processes. The conductive layer 64 may also be mechanically fixed to the ferromagnetic layer using soldering, brazing, welding, or any other mechanical attachment technique. The optimal thickness ($\delta_{cond}$) of the conductive layer 64 may be calculated using equation 6.

$$\delta_{cond} = \frac{k}{\sqrt{\pi \mu_o \mu^* \gamma f}} \quad (6)$$

Here, $\mu_o$ is the magnetic permeability of free space, $\mu^*$ is the relative magnetic permeability of the material selected for conductive layer 64 (for copper or aluminum $\mu^*$=1 but $\mu^*$ may be as high as 5), $\gamma$ is the conductivity of the material selected for the conductive layer 64 and f is the fundamental starting frequency of the voltage and current that is coupled from the controller 18 to the stator windings. The coefficient k was empirically determined based on the motor power per meter of stator axial length in the Z direction. Table 1 shows values of k for motors having powers per meter between 2 KW and 500 KW.

TABLE 1

| Motor Power (P) in KW per Meter of Stator Axial Length | k |
|---|---|
| 2 ≧ P ≧ 5 | 0.2 |
| 5 > P ≧ 10 | 0.3 |
| 10 > P ≧ 100 | 0.38 |
| 100 > P ≧ 500 | 0.48 |

Typically, the result of equation 6 dictates that, for f=10 Hz and k=0.3, the thickness of a conductive layer 64, such as a copper layer, is 0.3–0.4 mm. Preferably, the thickness of the conductive layer 64 is 10–12 percent of the thickness of the ferromagnetic layer 62.

In one embodiment, the conductive layer 64 may be a cylinder or band that is fitted around the main rotor structure 60 and that completely covers the ferromagnetic layer 62. In another embodiment, the conductive layer 64 may be a band of material that substantially encircles the main rotor structure 60 and substantially covers the ferromagnetic layer 62. The conductive layer 64 is shown as a cylinder or band of material having no holes therein. However, in alternative embodiments, the conductive layer 64 may have holes or slots cuts therein. Preferably, the axial length of the conductive layer 64 is equal to the axial length of the ferromagnetic layer 62.

While the above description is directed to a motor configuration having ferromagnetic layer 62 placed over a non-magnetic main rotor structure 60 fabricated from material such as plastic, in other embodiments the ferromagnetic layer 62 may be omitted if the non-magnetic main rotor structure 60 is replaced with a main rotor structure 60 of ferromagnetic material. However, if such a replacement is made, the ferromagnetic main rotor structure must have a thickness that is at least as thick as the thickness dictated by equation 5. For example, the main rotor structure 60 disclosed above as being fabricated of non-magnetic material may be fabricated from a ferromagnetic material such as carbon steel over which the conductive layer 64 in the form of a cylinder may be placed, provided the thickness of the ferromagnetic material exceeds that of the thickness prescribed by equation 5.

The stator 12 may be wound in a number of different configurations that affect the operating characteristics of the motor 10. The number of current phases used to drive the stator 12 determines the number of coil groups that contain all of the current phases. For example, a stator fed with phases A, B and C has a coil group containing three windings if all of the windings are wound on the stator in the same direction (e.g., all clockwise or all counter-clockwise wound). Such a coil group includes windings associated with phases A, B and C, which represent clockwise windings. Alternatively, a stator fed with phases A, B and C has a coil group containing six coils if each of the phases is wound onto the stator in each of two different directions (e.g., clockwise and counter-clockwise). Such a coil group includes windings associated with −A, −B and −C, wherein −A, −B and −C represent counter-clockwise windings. Each coil group has a flux inlet and a flux outlet. The distance between coil groups is referred to as pole pitch ($\lambda$). Typically, the more coils there are in a coil group, the longer the pole pitch of the stator.

Figure 7:
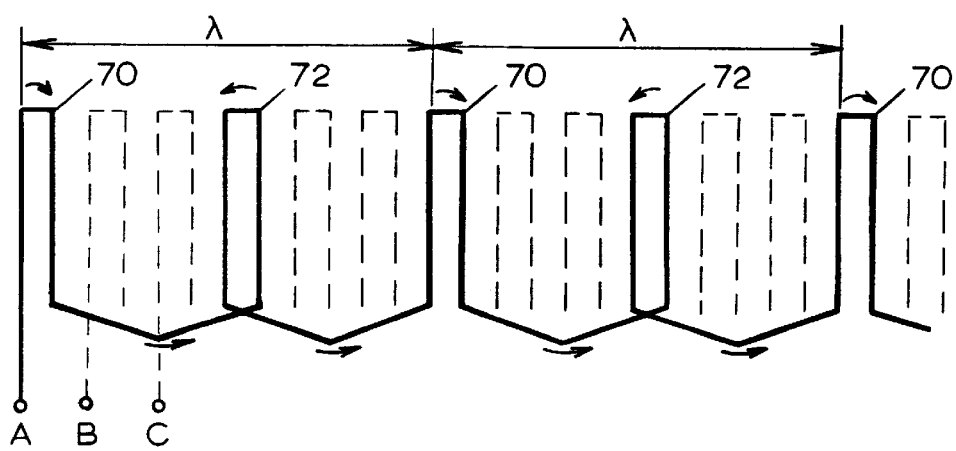
FIG. 7 is a schematic representation of a stator winding configuration having a long pole pitch.
Figure 8:
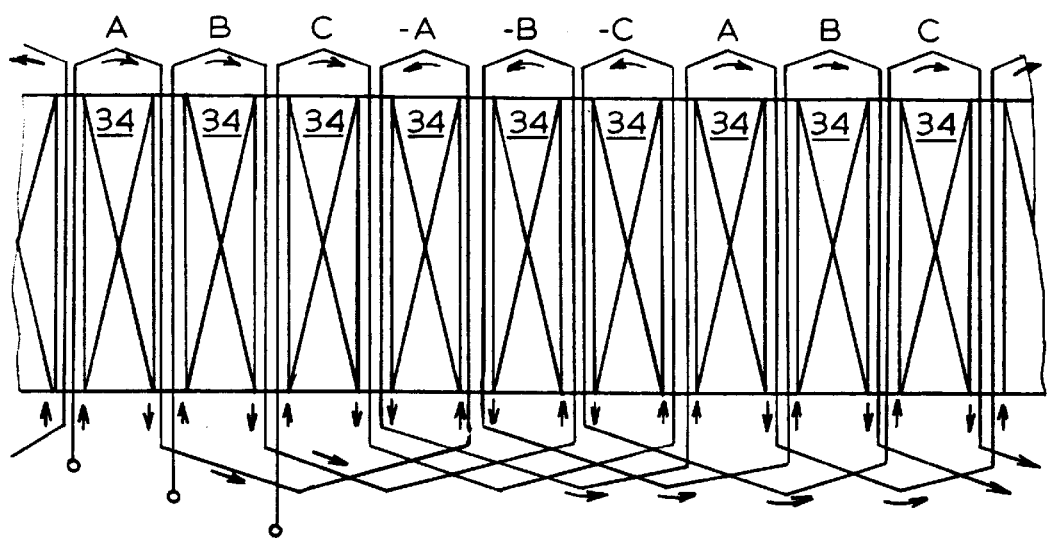
FIG. 8 is an elevational view of the inside of a stator illustrating how the windings are wound onto the stator to implement the schematic representation of the stator winding configuration shown in FIG. 7.

FIG. 7 illustrates a schematic representation of a stator winding configuration that has a long pole pitch ($\lambda$). The winding configuration shows phases A, B and C and a representation of how these phases should be wound on a stator. As shown, each of phases A, B and C are wound alternatively clockwise as represented by reference numeral 70 and counter-clockwise as represented by reference numeral 72, thereby creating coil groups having six coils. FIG. 8 illustrates a wiring diagram corresponding to the schematic representation of FIG. 7. Windings corresponding to phases A, B and C are wound around stator teeth 34 as shown. The clockwise windings are referred to by their phase names (e.g., A, B and C). Conversely, the counter-clockwise windings are referred to as the negative of their phase names (e.g., −A, −B and −C). This distinction is made with reference to the fields generated by the windings at a particular instant in time. For example, at the same instant the winding designated as A generates an electromagnetic field directed in a first direction, the winding designated as −A generates an electromagnetic field directed in a second direction that is substantially opposite the first direction.

Figure 9:
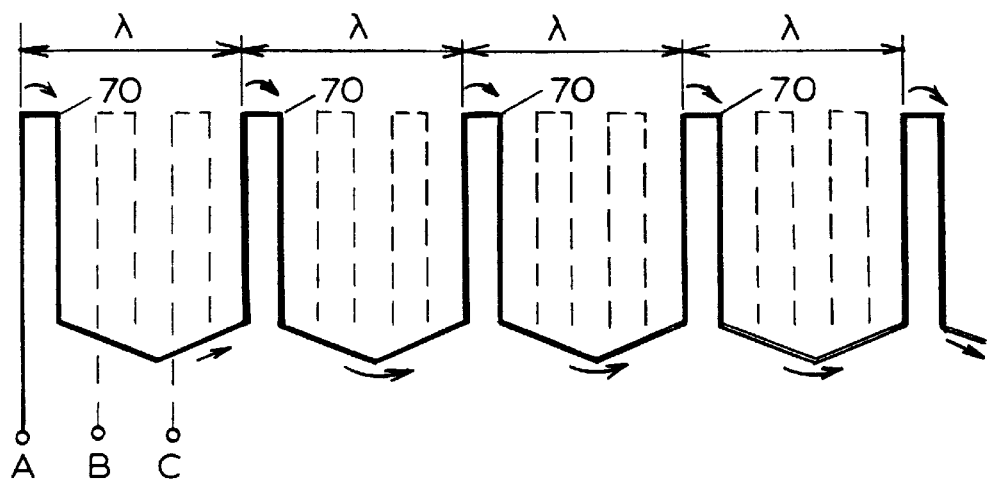
FIG. 9 is a schematic representation of a stator winding configuration having a short pole pitch.
Figure 10:
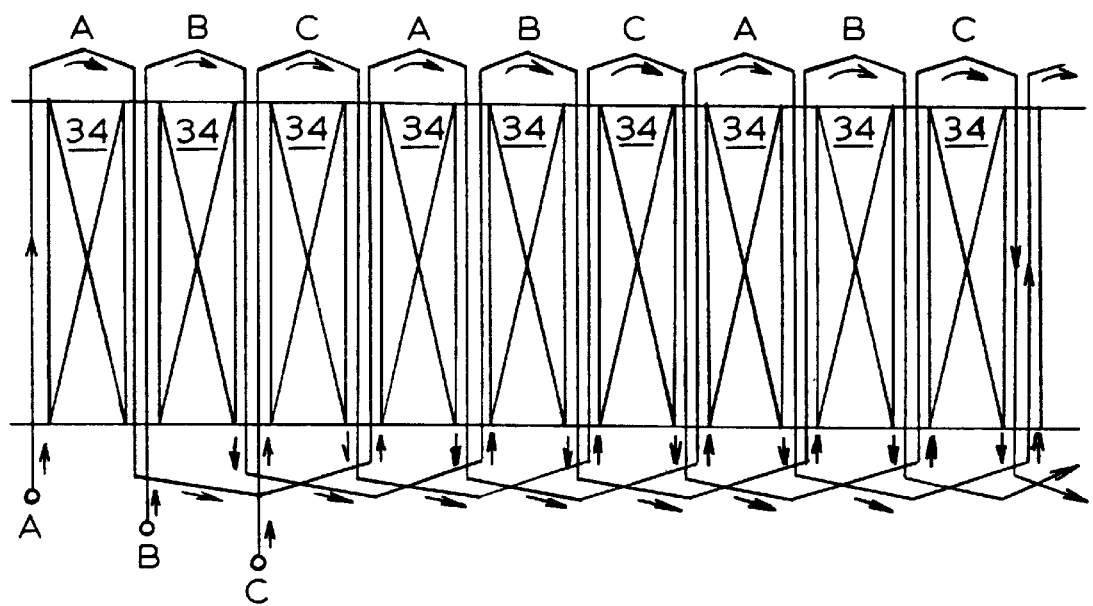
FIG. 10 is an elevational view of the inside of a stator illustrating how the windings are wound onto the stator to implement the schematic representation of the stator winding configuration shown in FIG. 9.

FIG. 9 illustrates a schematic representation of a stator winding configuration that has a short pole pitch ($\lambda$). As shown, each of phases A, B and C are wound clockwise, as represented by the numeral 70, thereby creating coil groups having three coils. FIG. 10 illustrates a wiring diagram corresponding to the schematic representation of FIG. 9. Windings corresponding to phases A, B and C are wound around stator teeth 34 as shown. Because each of the windings illustrated in FIG. 10 is wound clockwise around the stator teeth 34, each winding is referred to by its phase name (e.g., A, B and C). If, as shown in FIG. 8, some windings were wound counter clockwise, those windings would be referred to by the negative of their phase name (e.g., −A, −B and −C).

As previously mentioned, the number of coils in a coil group is related to the synchronous speed of the motor, which is the speed at which the magnetic field rotates with respect to the stator. Equation 7 defines synchronous speed (in units of poles per second) in terms of the frequency of the voltage and current fed to the stator and the number of coil groups on the stator. Equation 8 defines linear speed (in unit distance per second based on the pole pitch and the number of coil groups on the stator). Equations 9 and 10 define rotational speed (in revolutions per minute and revolutions per second, respectively) based on the frequency of the voltage and current fed to the stator and the number of coil groups on the stator.

$$\text{Synchronous Speed} = f \cdot p \quad (7)$$

$$\text{Linear Speed} = \lambda \cdot f \quad (8)$$

$$\text{Rotational Speed} = 60 f / p \quad (9)$$

$$\text{Rotational Speed} = f / p \quad (10)$$

Here, f is the fundamental frequency of the voltage and current fed to the stator, p is the number of coil groups on the stator 12 and $\lambda$ is the linear distance or pole pitch between poles. The greater the pole pitch $\lambda$ of a stator of a motor, the faster the rotor will spin for a fixed input voltage frequency. The shorter the pole pitch $\lambda$ of a stator, the more torque the motor will have. For example, a three coil pole pitch motor has more torque than a six coil pole pitch motor, but will operate at a slower speed than the six coil pole pitch motor for the same voltage frequency. Additionally, it is possible to switch between three coil pole pitch and six coil pole pitch configurations for a particular stator depending on the application of the motor.

It should be noted that stator winding configurations other than those shown in FIGS. 7–10 may be used. No matter which stator winding configuration is selected, the stator 12 including the windings thereon may be coated to protect the stator 12 from water or aggressive liquids in which the stator 12 may be submerged. Such coatings may include epoxy, varnish, plastic or rubber and may be applied to the stator 12 by dipping, spraying or vacuum deposition. Regardless of the coating selected or the method by which that coating is applied, the coating is preferably vibration tolerant because the stator may be installed in an environment having significant vibrations.

As noted previously, a motor constructed in accordance with the teachings of the present invention has a layer of conductive material disposed over a layer of ferromagnetic material. Such a construction enables Lorentz, Maxwell and hysteresis effect forces to be exploited to yield a motor having superior performance in terms of both torque and efficiency, while using a simple rotor structure. Each of the Lorentz, Maxwell and hysteresis effect forces, as they are believed to function in a motor constructed in accordance with the teachings of the present invention, will be described in turn below. The following descriptions illustrate the electromagnetic fields generated by a stator at one particular time designated as $t_o$. At time $t_o$, the phase of the voltages coupled from the controller 18 to the stator 12 are as illustrated in FIG. 2.

Figure 11:
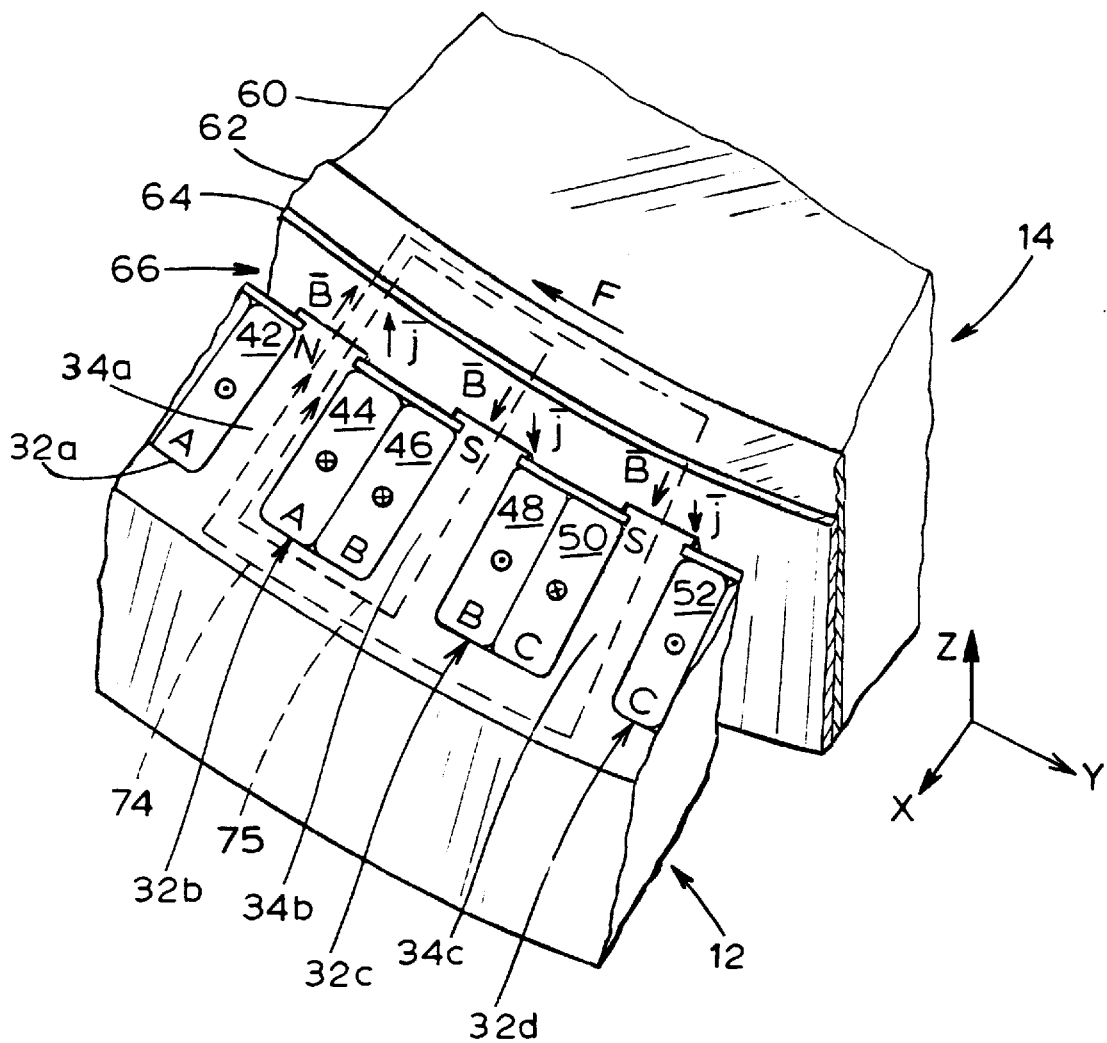
FIG. 11 is an exploded detail view illustrating the interaction of the rotor layers and the magnetic fields generated by the stator of FIG. 3, which results in Lorentz force.

Lorentz force, which is caused by the interaction of a magnetic field and a current, is defined as the vector cross product of a current and a magnetic field (j×B). FIG. 11 illustrates the interaction of a stator 12 and a rotor 14 that yields a Lorentz force, which causes the rotor 14 to move with respect to the stator 12. The stator 12 is wound in an identical fashion to the stator illustrated in FIG. 4. However, in this case the symbols ⊗ and ⊙ indicate current flow into and out of the plane of the paper, respectively. Following the right hand rule, at time $t_o$ the first tooth 34a forms a north pole and the second and third teeth 34b, 34c form south poles. Although only three teeth 34a–c are shown, this polarization pattern repeats across all of the teeth 34 of the stator 12 at time $t_o$. As illustrated in FIG. 11, magnetic flux loops 74, 75 generated at the tooth 34a put three teeth (34a–34c) and a section of the ferromagnetic layer 62 of the rotor 14 into a magnetic circuit, wherein flux flows from the first tooth 34a across the air gap 66 and into the conductive and ferromagnetic layers 64, 62 and back into the stator 12 through the teeth 34b and 34c.

As illustrated in FIG. 11, magnetic flux 74, 75 or field B (represented by $\overline{B}$) from the first tooth 34a crosses the air gap 66 and the conductive and ferromagnetic layers 64, 62 in the −X direction, thereby inducing eddy currents j (represented by $\overline{j}$) in both of the layers 62, 64. The eddy currents induced in the conductive layer 64 are much stronger than those induced in the ferromagnetic layer 62 because the conductive layer 64 has a higher conductivity than the ferromagnetic layer 62. The induced currents in the ferromagnetic and conductive layers 62, 64 are phase shifted relative to the magnetic flux 74, 75 that induces those currents. The phasing of the induced current in the conductive layer 64 is such that the induced currents interact with their inducing magnetic field to create a Lorentz force. Components of this force are directed in the azimuth direction, thereby causing the rotor 14 to rotate relative to the stator 12. For example, as shown in FIG. 11, as the magnetic field B from the first tooth 34a induces a current j directed mainly in the Z direction on the conductive layer 64, the phase of the current j is such that the cross product j×B yields a tangential force F in the −Y direction that causes the rotor 14 to move in a clockwise direction. Similarly, as the magnetic flux B crosses from the ferromagnetic layer 62 of the rotor 14 to the stator 12 in the region of the second and third teeth 34b, 34c in the X direction and induces currents j in the −Z direction on the conductive layer 64 that are phased oppositely of the currents induced by the magnetic field B produced at the first tooth 34a. The magnetic fields B in the region of the second and third teeth 34b, 34c interact with the induced currents j to create additional Lorentz forces F directed in the −Y direction that tend to move the rotor 14 in the clockwise direction. In addition to the Lorentz forces generated due to currents induced in the conductive layer 64, weaker Lorentz forces are developed due to the induced currents in the ferromagnetic layer 62 and their interaction with the magnetic field B.

The magnitude of the Lorentz force developed in the conductive and ferromagnetic layers 64, 62 is dependent on the thickness of the conductive layer 64. For example, the thinner conductive layer 64, the more magnetic flux penetrates into ferromagnetic layer 62 due to the decreased magnetic resistance of the thinner conductive layer, which results in relatively strong Lorentz force and Lorentz torque. However, as the density of induced currents increases, the ohmic losses in the ferromagnetic layer 62 increase and the magnitude of the induced current decreases.

FIG. 12 illustrates the role that Maxwell force plays in creating relative motion between the rotor 14 and the stator 12. The mechanical and winding structures shown in FIG. 12 are identical to those of FIG. 11. Likewise, for the description with respect to FIG. 12, the assumption will be made that the voltage signals coupled to the stator windings are identical to those illustrated in FIG. 2 at time $t_o$.

As a magnetic flux 74, 75 or field B moves from the first tooth 34a across the air gap 66, through the conductive layer 64 and penetrates into ferromagnetic layer 62 of the rotor 14, the ferromagnetic layer 62 cannot instantly re-distribute the incoming flux. As illustrated in FIG. 12, flux coupled to the rotor from the first tooth 34a, returns to the stator through teeth 34b and 34c. FIG. 13 illustrates the distribution of magnetic flux in the ferromagnetic layer 62 across first and second regions designated by reference numerals 76 and 77. As represented by the dots of varying size in the ferromagnetic layer 62 of FIG. 12, the magnitude of flux in the ferromagnetic layer 62 is lower in the first region 76 to the left of the center of the first tooth 34a than it is in the second region 77 to the right of the center of the first tooth 34a. As a result of the non-uniform flux distribution in the ferromagnetic layer 62, the level of magnetization force in the ferromagnetic layer 62 is different in the first and second regions 76, 77, thereby forming a temporary north pole in the first region 76 and a temporary south pole in the second region 77.

Due to the flux distribution in the ferromagnetic layer 62 and the temporary north and south poles that it creates in the first and second regions 76, 77, Maxwell attractive forces are created between the first region 76 of the rotor and the south poles of the stator and the second region 77 and the north poles of the stator. Likewise, Maxwell repulsive forces are created between the first region 76 of the rotor and the north poles of the stator and between the second region 77 of the rotor and the south poles of the stator. The resultant Maxwell force F, as shown in FIG. 12, causes the rotor 14 to rotate clockwise with respect to the stator 12.

It is important to note that the lower the pole pitch, the higher the azimuth gradient of magnetic induction in the air gap 66 and, therefore, the higher the Maxwell force. Accordingly, winding configurations having high pole pitch will not have strong Maxwell forces that contribute to the force causing rotation of the rotor 14 with respect to the stator 12.

The radial components of the Maxwell force can be very strong due to the fact that the ferromagnetic layer 62 of the rotor 14 magnetically attracts to the stator poles in the radial direction. In classical asynchronous motors this attractive magnetic force requires mechanical structures to be very rigid to prevent deformation of the stator and local reduction of the air gap 66, which may cause contact between the rotor 12 and the stator 14. However, in motors designed in accordance with the present invention, the attractive forces are alleviated through the use of the conductive layer 64, which is disposed on the outside of the ferromagnetic layer 62. As mentioned previously, the conductive layer 64 contains induced currents. These currents interact with the current in the windings of the stator 12 to create radial components of Lorentz forces that compensate for the radial Maxwell force. The higher the current frequency and the thicker the conductive layer 64, the stronger the Lorentz repulsion force and, therefore, the more the compensation for the radial Maxwell force. Therefore, the thickness of the conductive layer 64 is preferably between 0.2 mm and 0.4 mm, when the air gap 66 between rotor 14 and stator 12 is approximately 3.5 mm.

FIG. 14 illustrates the role that hysteresis effect force plays in creating relative motion between the rotor 14 and the stator 12. The mechanical and winding structures shown in FIG. 14 are identical to those of FIGS. 11 and 12. Likewise, for description with respect to FIG. 14, the assumption will be made that the voltage signals coupled to the stator windings are identical to those illustrated in FIG. 2 at time $t_o$.

The hysteresis effect force develops very intensely in motors designed in accordance with the teachings of the present invention that have a short pole pitch. This effect appears as a result of magnetic anisotropy in the ferromagnetic layer 62 caused by the rotating magnetic field of the stator 12. The rotating magnetic field travels around the stator 12 at a speed that is slightly faster than the speed at which the rotor 14 rotates. The rotating magnetic field penetrates into ferromagnetic layer 62 of the rotor 14 and remagnetizes portions 82, 86 of the ferromagnetic layer 62. The remagnetized portions 82, 86 have a lower magnetic permeability than that of regions 80 and 84 that are not magnetized. Before and after the rotating magnetic field penetrates into ferromagnetic layer 62, the level of magnetization force in these regions is different. When a stator 12 pole changes polarity, the same effect occurs in the rotor and the wave of remagnetization follows from initial magnetic induction wave. As a result of the remagnetization of regions 82, 86 of the ferromagnetic layer 62 by the passing of the rotating magnetic field, the magnetic permeability of the ferromagnetic layer 62 is different before and after a particular pole. After the pole has passed, the magnetic permeability is lower than it was previously and, therefore, a supplementary force and torque appear. The torque that is developed is represented as follows by equation 11.

$$T = \frac{PV_r}{4\pi} \frac{B_m^2}{\mu_o \mu^*} \sin\alpha \tag{11}$$

Here, P is the number of coils in one coil group, $V_r$ is the volume of the ferromagnetic layer of the rotor, $B_m$ is the maximum level of magnetic induction in the air gap, $\alpha$ is the hysteresis characteristic of the ferromagnetic material, $\mu_o$ is $4\pi \times 10^{-7}$ H/m, and $\mu^*$ is the local relative magnetic permeability of the ferromagnetic layer.

The hysteresis effect force is most pronounced when the ferromagnetic layer 62 of the rotor 14 is very thin and the magnetization force in the ferromagnetic layer 62 is high. Motors designed as described herein can have a hysteresis effect force that provides up to 20 percent extra torque over and above the torque provided by the Lorentz and Maxwell forces.

Figure 15:
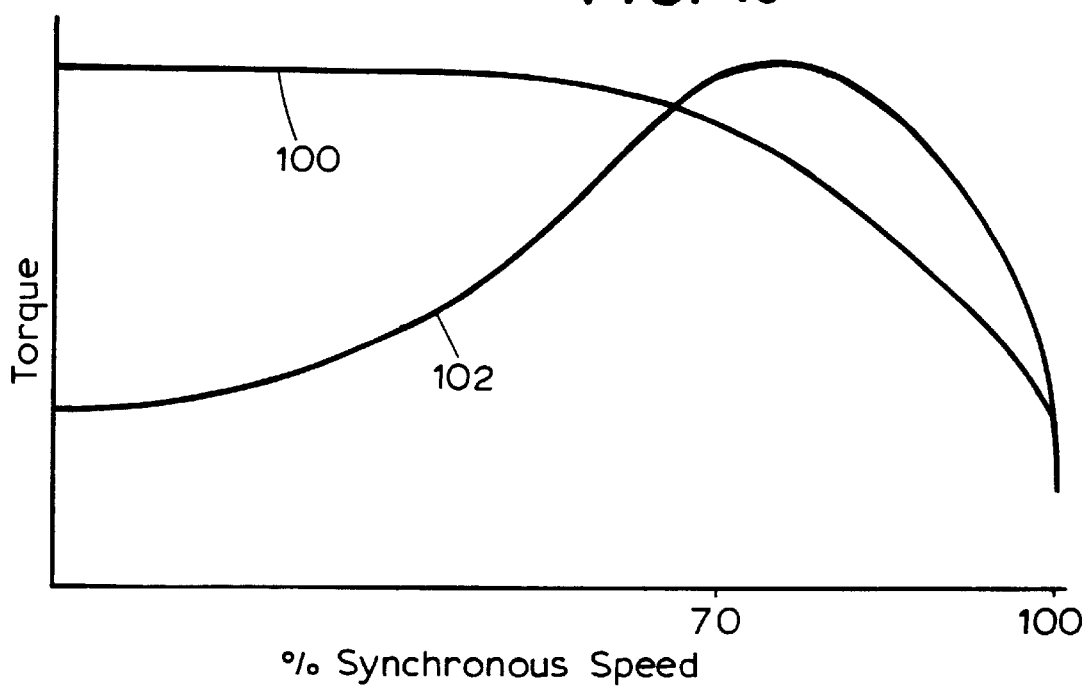
FIG. 15 is a graph representing the torque characteristics of a Class B squirrel cage motor and one embodiment of a motor designed in accordance with the teachings of the present invention.

The advantages of a motor constructed as described herein may be illustrated by comparing torque and efficiency of such a motor with a class B squirrel cage induction motor. Torque as a function of percent of synchronous speed for the motor described herein is shown in FIG. 15 at reference numeral 100 and torque as a function percent of synchronous speed for a squirrel cage motor is shown at reference numeral 102. As illustrated in FIG. 15, the motor described herein provides superior torque at low percentages of synchronous speed. High torque at low percentages of synchronous speed is advantageous in applications requiring a motor to repeatedly start, stop or change directions. In such applications, the motor will frequently operate at low percentages of synchronous speed. Therefore, a motor designed as described herein will have superior performance in such applications.

Figure 16:
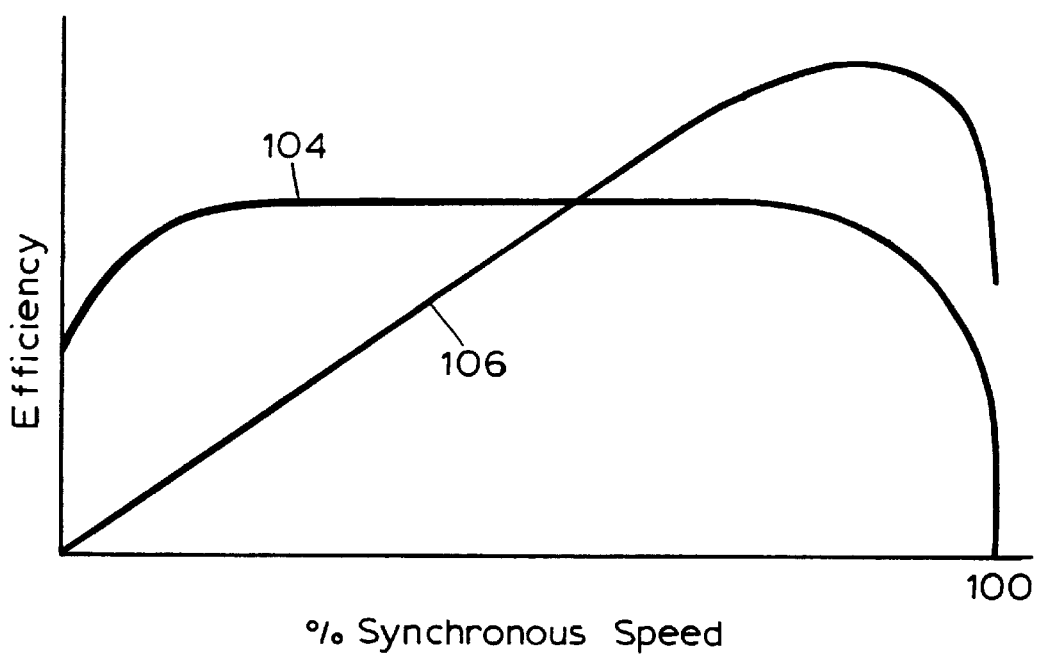
FIG. 16 is a graph representing the efficiency characteristics of a Class B squirrel cage motor and one embodiment of a motor designed in accordance with the teachings of the present invention.

The efficiencies as a function of percent of synchronous speed for both the motor described herein and a squirrel cage motor 106 are shown in FIG. 16. As illustrated in FIG. 16, the motor described herein provides superior efficiency at low percentages of synchronous speed. High efficiency at low percentages of synchronous speed is advantageous in applications requiring a motor to frequently start, stop or change direction, while requiring the motor to be efficient. Such application causes the motor to frequently be operated at low percentages of synchronous speed. Therefore, a squirrel cage induction motor will be frequently operated in its low efficiency range in applications requiring the motor to operate at a low percentage of synchronous speed. Conversely, a motor designed as described herein operates very efficiently in applications requiring frequent operation at low percentages of synchronous speed.

The efficiency and torque characteristics of a motor constructed in accordance with the teachings hereof indicate that such a motor has superior performance to a squirrel cage induction motor in applications requiring repeated motor starting, stopping and direction changing. Such applications exploit the percent of synchronous speed efficiency and torque characteristics of the motor described herein.

One advantageous use of a motor designed in accordance with the description hereof is in a washing machine. The various cycles of a washing machine (e.g., spin, wash, etc.) require various speeds of operation and direction changes, and nearly all of the cycles require substantial torque due to the clothing load that the motor must turn.

Figure 17:
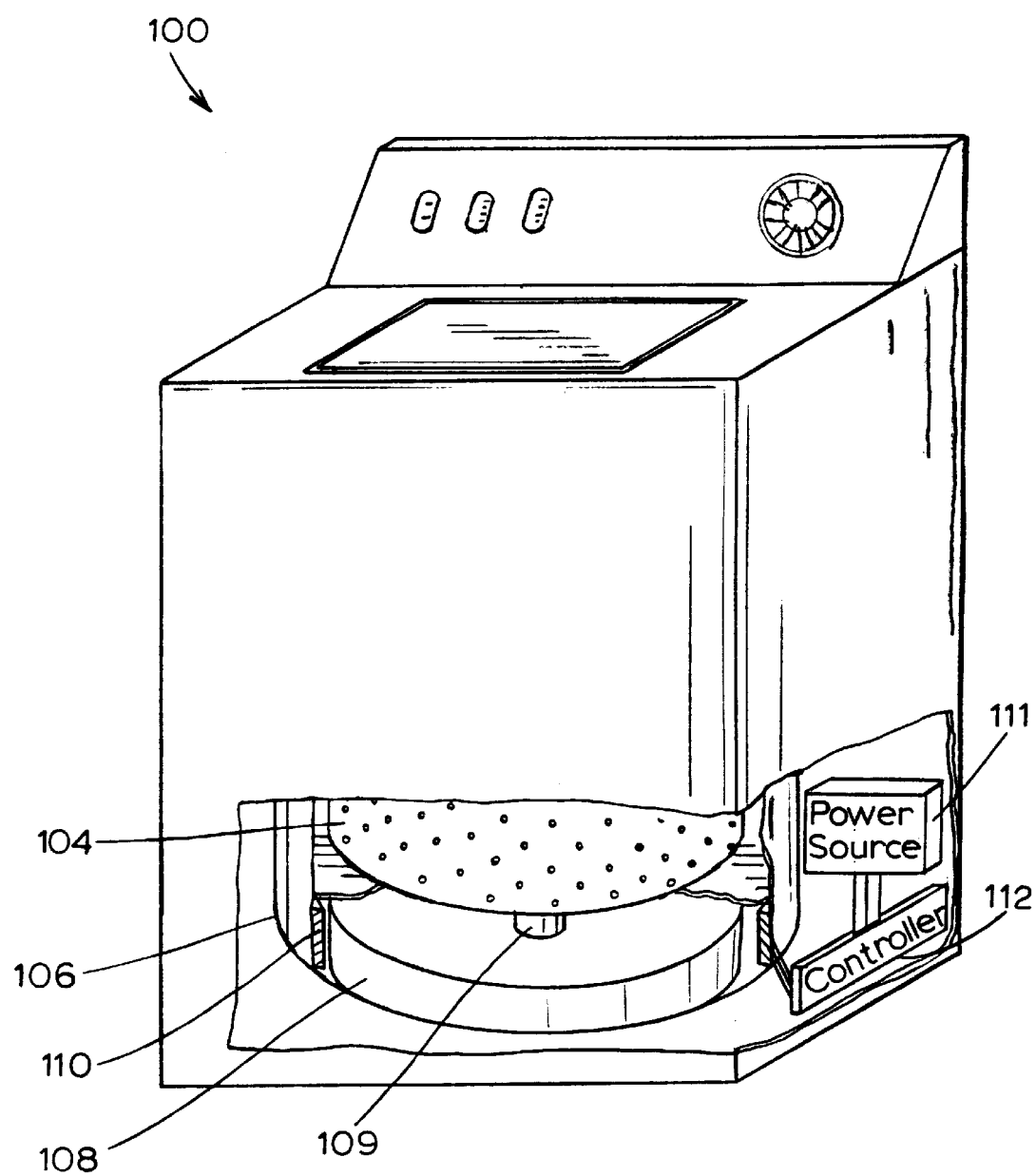
FIG. 17 is an illustration of a washing machine employing one embodiment of a motor designed in accordance with the teachings of the present invention.

FIG. 17 shows a washing machine 100 having a front panel shown partially in section. The washing machine 100 includes a basket 104 into which the clothes to be washed are placed. The basket 104 is disposed inside of a tank 106 (shown partially in section) that is filled with water during various phases of a washing cycle. A rotor 108 designed as described previously is mounted to the bottom of the basket 104 outside of the tank 106 by a shaft 109. The washing machine 100 further includes a stator 110, a power source 111 and a controller 112. The power source 111 supplies power to the controller 112, which generates signals that are coupled to the stator 110. The stator 110 is mounted on the tank 106 and, as described above, generates rotating electromagnetic fields that interact with the rotor 108 to cause the rotor 108 to move with respect to the stator 110.

Figure 18:
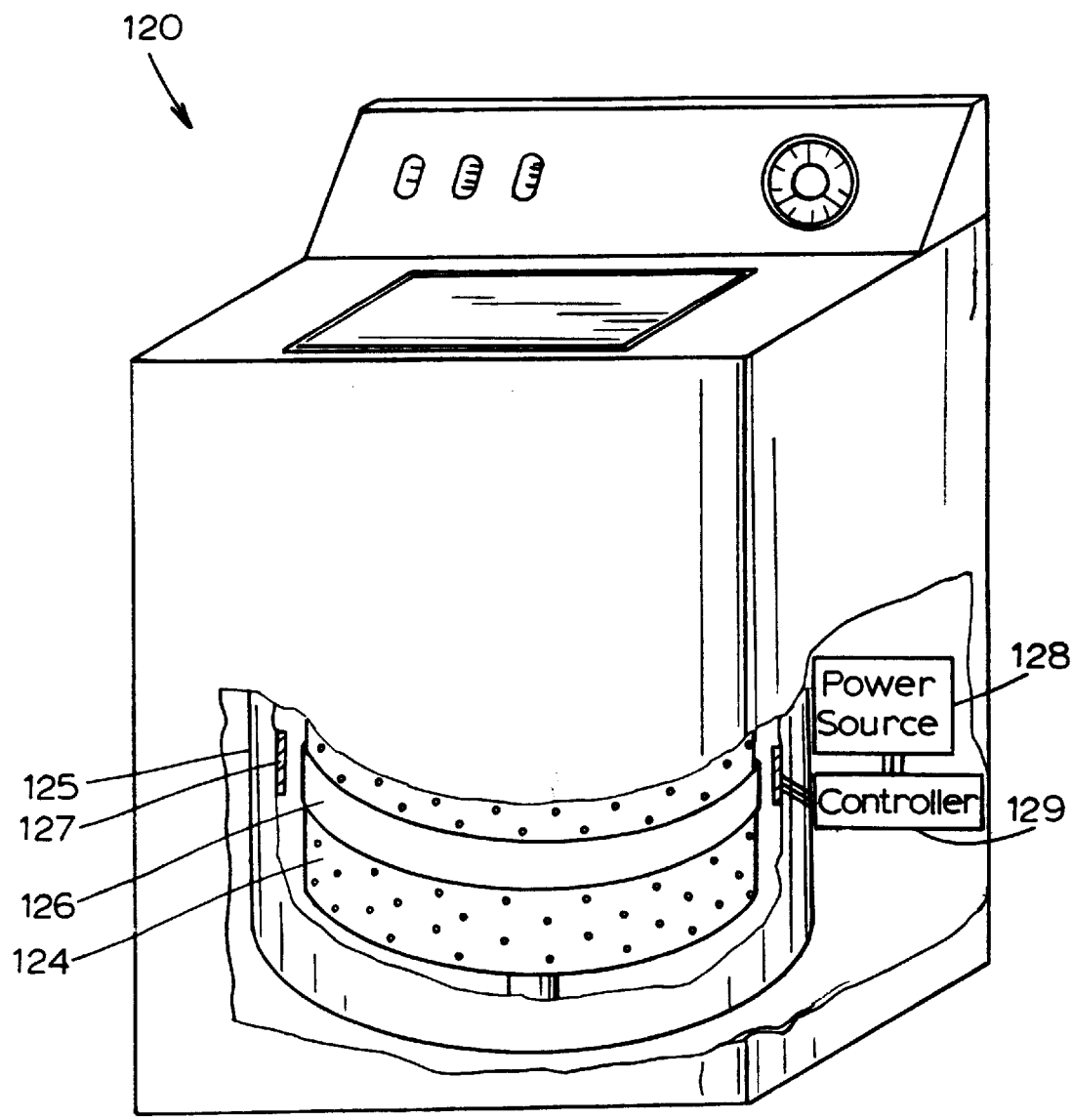
FIG. 18 is an illustration of a washing machine employing an alternative embodiment of a motor designed in accordance with the teachings of the present invention.

FIG. 18 shows an alternate embodiment of a washing machine 120 with a front panel shown partially in section. Like the washing machine 100, the washing machine 120 also includes a basket 124 that is disposed within a tank 125 (shown partially in section). However, the washing machine 120 differs from the washing machine 100 in that a rotor 126 is not fixed to the bottom of the basket 124. Rather, the rotor 126 comprises a conductive layer disposed over a ferromagnetic layer, wherein both of the layers are mounted directly to the basket 124. The washing machine 120 further includes a stator 127, a power source 128 and a controller 129. The power source 128 provides power to the controller 129, which generates signals that are coupled to the stator 127. Such a configuration makes it possible to retrofit an old washing machine with a motor as described herein.

It should be noted that the basket 124 may be fabricated from a non-magnetic material such as stainless steel or plastic, in which case both the ferromagnetic and the conductive layers must be added to the basket 124. Alternatively, the basket 124 may be fabricated from a ferromagnetic material, in which case a separate ferromagnetic layer is not necessary and the conductive material may be installed directly onto the ferromagnetic basket 124, provided the ferromagnetic basket 124 has a thickness approximately equal to or greater than the thickness dictated by equation 3.

Figure 19:
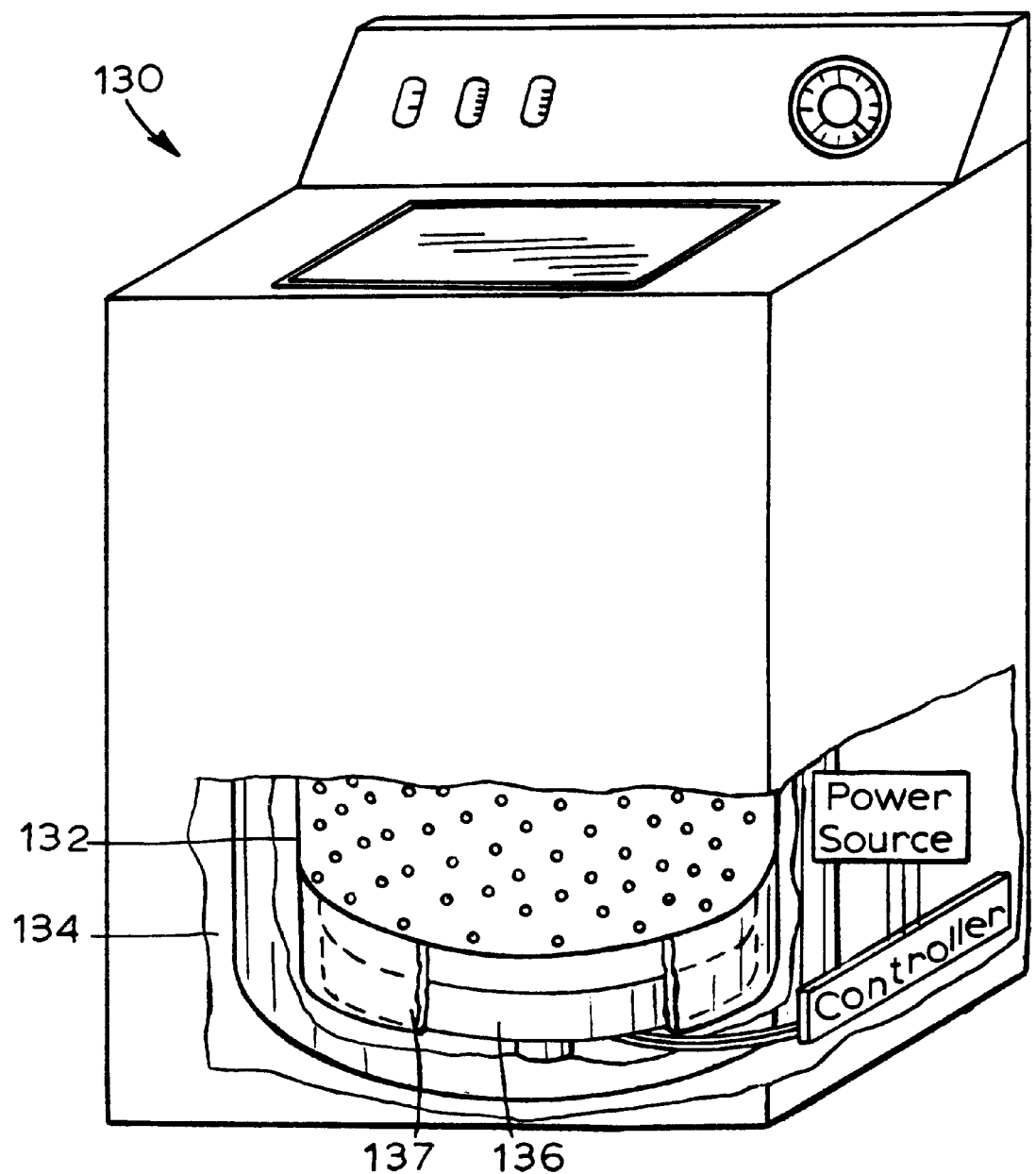
FIG. 19 is an illustration of a washing machine employing an alternative embodiment of a motor designed in accordance with the present invention.

FIG. 19 shows another alternate embodiment of a washing machine 130 with a front panel shown partially in section. Like the washing machines 100 and 120, the washing machine 130 also includes a basket 132 that is disposed within a tank 134 (shown partially in section). However, the washing machine 130 has a stator 136 disposed inside of a rotor 137, which is mounted to the basket 132. In such a configuration, the rotor 137 has the two layer design as disclosed hereinbefore.

In addition to the torque and efficiency advantages provided by a motor designed as described herein, an added advantage is the softening of the water that the washing machine uses when the magnetic field generated by the stator passes through the washing water. The rotating magnetic field produced by the stator interacts with the magnesium and calcium ions in the water in the washing machine tank to soften the water, thereby making soap or detergent used in the washing machine more effective for washing clothes.

Although the three foregoing examples disclose the application of a motor to washing machines, it should be noted that such motors may be used in many other applications. For example, such motors may be used in cement mixers, heating and ventilation systems, pumps and the like. Generally, the motor described herein may be advantageously used in any application in which high torque and efficiency at low percentages of synchronous speed are desired.

Figure 20:
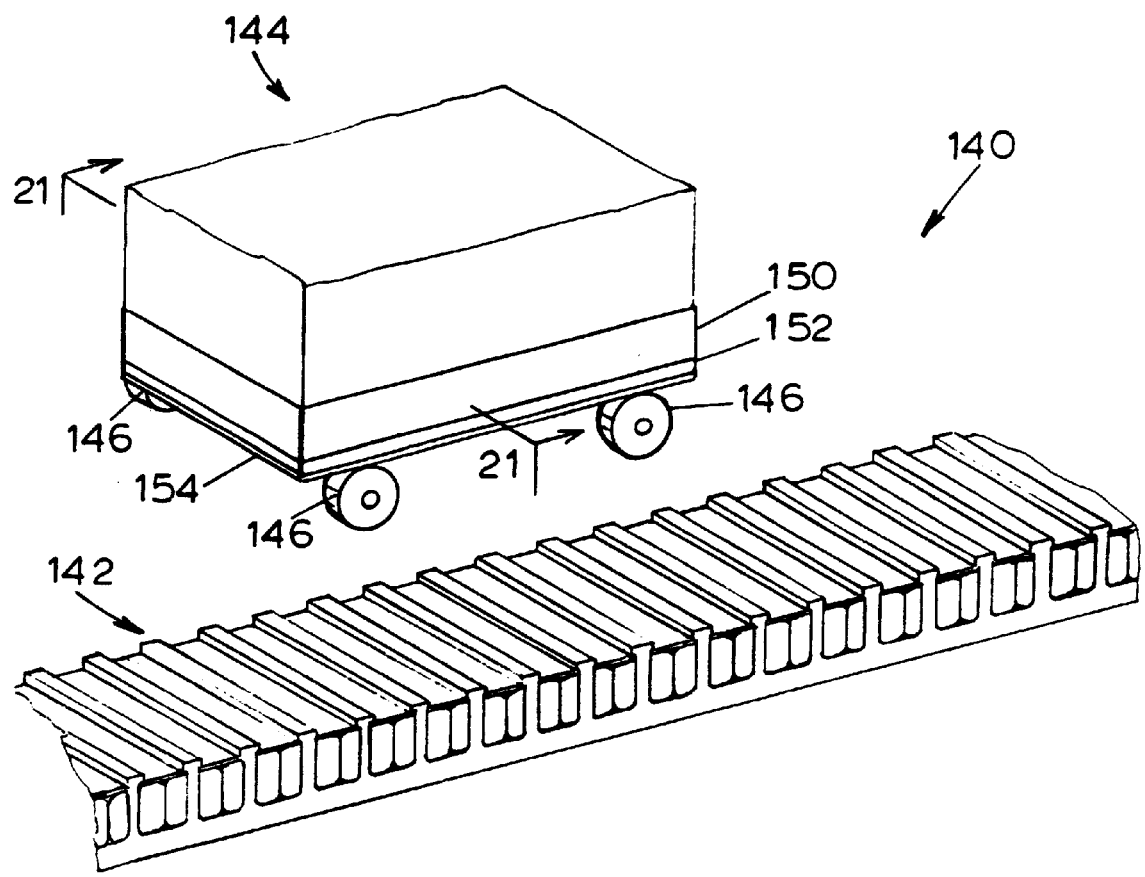
FIG. 20 is a diagram of a linear motor designed in accordance with the teachings of the present invention.

As noted previously, the motor concepts described herein may be applied to a linear motor 140 as shown in FIG. 20. The linear motor 140 includes a stator 142 and a rotor 144. The stator 142 may be constructed in an identical manner to the stator 12 used in conjunction with the cylindrical motor disclosed above. However, the linear motor stator 142 is substantially planar. When the coils on the linear stator 142 are excited, a traveling magnetic field runs down the length of the stator 142 in substantially the same manner as the rotating magnetic field traverses a cylindrical stator.

Figure 21:
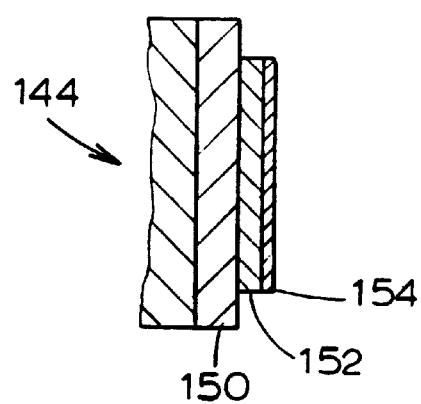
FIG. 21 is a cross sectional view of a vehicle used in conjunction with a linear motor taken along line 21—21 shown in FIG. 20.

The rotor 144 used in the linear motor 140 is a cart or vehicle that is substantially planar and may have wheels 146 that allow the rotor 144 to travel the length of the stator 142 as the stator 142 is excited. Referring to FIG. 21, a cross section of the rotor 144 reveals that the rotor 144 includes a main rotor structure 150, which may be constructed from a non-magnetic material such as stainless steel or plastic, onto which a ferromagnetic layer 152 is disposed. A conductive layer 154 is disposed on the ferromagnetic layer 152.

Alternatively, the main rotor structure 150 may be fabricated from a ferromagnetic material such as carbon steel. In such cases, the ferromagnetic layer 152 may be omitted and the conductive layer 154 may be placed directly on the ferromagnetic main rotor structure 150, provided the ferromagnetic material has a minimal thickness as directed by equation 5.

The same forces that cause the rotor 14 of a cylindrical rotor to move with respect to the stator 12 when the coils of the stator 12 are energized with an alternating current signal, cause the rotor 144 to move with respect to the stator 142 when the stator 142 coils are energized. Specifically, Lorentz force is developed by the interaction of a stator field and induced currents on the conductive layer 154. Additionally, Maxwell and hysteresis effect forces develop in the ferromagnetic layer 152 and force the rotor 144 to move linearly with respect to the stator 142.

The linear motor 140 has many application including, but not limited to, conveyor systems, mass transmit, elevators and any other applications requiring linear motion. Like the cylindrical motor disclosed above, the linear motor 140 has high efficiency and torque at low percentages of synchronous speed. Accordingly, the linear motor 140 is well suited to applications requiring repeated starting stopping and direction changing.

Obviously, many modifications and variations of the invention as hereinbefore set forth can be made without departing from the spirit and scope thereof and therefore only such limitations should be imposed as are indicated by the appended claims. For example, while the disclosed embodiments show a stator on the outside of a rotor, one of ordinary skill in the art will readily recognize that such a configuration could be changed to have the stator on the inside of the rotor.

What is claimed is:

1. A device for converting electrical energy into mechanical work, comprising:
   a washing machine basket having a radial length and a circumference, wherein the circumference of the washing machine basket comprises a substantially non-magnetic material;
   a ferromagnetic layer having a radial thickness, the ferromagnetic layer being disposed on the circumference of the washing machine basket, wherein the radial thickness of the ferromagnetic layer is less than the radial length of the washing machine basket;
   a conductive layer disposed on the ferromagnetic layer; and
   a stator disposed substantially along the circumference of the washing machine basket, the ferromagnetic layer and the conductive layer, wherein the stator is adapted to carry an alternating current signal.

2. A device for converting electrical energy into mechanical work, comprising:
   a substantially hollow rotor body having a radial length and a circumference, wherein the rotor body is not permanently magnetized;
   a ferromagnetic layer having a radial thickness, the ferromagnetic layer being disposed on the circumference of the substantially hollow rotor body, wherein the radial thickness of the ferromagnetic layer is less than the radial length of the substantially hollow rotor body;
   a conductive layer disposed on the ferromagnetic layer; and
   a stator disposed substantially along the circumference of the substantially hollow rotor body, the ferromagnetic layer and the conductive layer, wherein the stator is adapted to carry an alternating current signal.

3. The device of claim 1, wherein the conductive layer comprises a relative magnetic permeability of approximately one.

4. The device of claim 1, wherein the conductive layer comprises a relative magnetic permeability of less than about five.

5. The device of claim 1, wherein the conductive layer has a radial thickness that is less than the radial thickness of the ferromagnetic layer.

6. The device of claim 1, wherein the ferromagnetic layer comprises a continuous layer of material.

7. The device of claim 1, wherein the ferromagnetic layer comprises a band of material that substantially encircles the outer circumference of the washing machine basket.

8. The device of claim 1, wherein the conductive layer comprises a band of material that substantially encircles the outer circumference of the washing machine basket.

9. The device of claim 1, wherein the ferromagnetic layer comprises a relative magnetic permeability of approximately 2000.

10. The device of claim 1, wherein the ferromagnetic layer is conductive and comprises a relative magnetic permeability between about 1500 and about 2500.

11. The device of claim 1, wherein the ferromagnetic layer is non-conductive and comprises a relative magnetic permeability greater than about 2000.

12. The device of claim 1, wherein the stator has an axial length and the conductive layer has an axial length and wherein the axial length of the conductive layer is greater than the axial length of the stator.

13. The device of claim 1, wherein a conductivity of the conductive layer is not less than $30 \times 10^6$ 1/Ohm meter.

14. The device of claim 1, wherein the conductive layer has a radial thickness according to:

$$\delta = \frac{k}{\sqrt{\pi \mu_o \mu^* \gamma f}}$$

wherein:
   $\delta$ is the radial thickness of the conductive layer;
   $k$ is a number between and including about 0.2 and about 0.5;
   $\pi$ is the constant Pi;
   $\mu_o$ is the electromagnetic permeability of free space;
   $\mu^*$ is a relative magnetic permeability of the conductive layer;
   $\gamma$ is a conductivity of the conductive layer; and
   $f$ is a frequency of the alternating current signal.

15. The device of claim 1, wherein the ferromagnetic layer has a radial thickness that is equal to or greater than:

$$\delta = \frac{k}{\sqrt{\pi \mu_o \mu^* \gamma f}}$$

wherein:
   $\delta_{Fe}$ is the radial thickness of the ferromagnetic layer;
   $\mu^*$ is a relative magnetic permeability of the ferromagnetic layer; and
   $b$ is a radial thickness of the stator.

16. The device of claim 2, wherein the circumference comprises an outer circumference.

17. The device of claim 2, wherein the circumference comprises an inner circumference.

18. The device of claim 2, wherein the conductive layer comprises a relative magnetic permeability of approximately one.

19. The device of claim 2, wherein the conductive layer comprises a relative magnetic permeability of less than about five.

20. The device of claim 2, wherein the conductive layer has a radial thickness that is less than the radial thickness of the ferromagnetic layer.

21. The device of claim 2, wherein the ferromagnetic layer comprises a continuous layer of material.

22. The device of claim 2, wherein the ferromagnetic layer comprises a band of material that substantially encircles the outer circumference of the substantially hollow rotor body.

23. The device of claim 2, wherein the conductive layer comprises a band of material that substantially encircles the outer circumference of the substantially hollow rotor body.

24. The device of claim 2, wherein the ferromagnetic layer comprises a relative magnetic permeability of approximately 2000.

25. The device of claim 2, wherein the ferromagnetic layer is conductive and comprises a relative magnetic permeability between about 1500 and about 2500.

26. The device of claim 2, wherein the ferromagnetic layer is non-conductive and comprises a relative magnetic permeability greater than about 2000.

27. The device of claim 2, wherein the stator has an axial length and the conductive layer has an axial length and wherein the axial length of the conductive layer is greater than the axial length of the stator.

28. The device of claim 2, wherein the substantially hollow rotor body has an axial length and wherein the axial length of the substantially hollow rotor body is less than the radial length of the substantially hollow rotor body.

29. The device of claim 2, wherein a conductivity of the conductive layer is not less than $30 \times 10^6$ 1/Ohm meter.

30. The device of claim 2, wherein the conductive layer has a radial thickness according to:

$$\delta = \frac{k}{\sqrt{\pi \mu_o \mu^* \gamma f}}$$

wherein:

δ is the radial thickness of the conductive layer;

k is a number between and including about 0.2 and about 0.5;

π is the constant Pi;

$\mu_o$ is the electromagnetic permeability of free space;

$\mu^*$ is a relative magnetic permeability of the conductive layer;

γ is a conductivity of the conductive layer; and f is a frequency of the alternating current signal.

31. The device of claim 2, wherein the substantially hollow rotor body comprises a washing machine basket.

32. The device of claim 2, wherein the ferromagnetic layer has a radial thickness that is equal to or greater than:

$$\delta_{Fe} = \frac{184b}{\mu^*}$$

wherein:

$\delta_{Fe}$ is the radial thickness of the ferromagnetic layer;

$\mu^*$ is a relative magnetic permeability of the ferromagnetic layer; and b is a radial thickness of the stator.

* * * * *